(12) United States Patent
Pfannschmidt

(10) Patent No.: US 7,714,467 B2
(45) Date of Patent: May 11, 2010

(54) ELECTRIC MACHINE WITH COOLANT GUIDING CHANNEL AND CORRESPONDING COOLING METHOD

(75) Inventor: Bernd Pfannschmidt, Rosstal (DE)

(73) Assignee: Siemens Aktiengesellschaft, München (DE)

( * ) Notice: Subject to any disclaimer, the term of this patent is extended or adjusted under 35 U.S.C. 154(b) by 31 days.

(21) Appl. No.: 10/566,773

(22) PCT Filed: Jul. 23, 2004

(86) PCT No.: PCT/EP2004/008299

§ 371 (c)(1),
(2), (4) Date: Jul. 12, 2006

(87) PCT Pub. No.: WO2005/013461

PCT Pub. Date: Feb. 10, 2005

(65) Prior Publication Data

US 2006/0273669 A1 Dec. 7, 2006

(30) Foreign Application Priority Data

Jul. 31, 2003 (DE) ................. 103 35 141

(51) Int. Cl.
*H02K 9/04* (2006.01)
(52) U.S. Cl. ................ 310/58; 310/216.001
(58) Field of Classification Search .......... 310/58, 310/216
See application file for complete search history.

(56) References Cited

U.S. PATENT DOCUMENTS

| | | | | |
|---|---|---|---|---|
| 1,373,002 A * | 3/1921 | Hellmund | ................ | 310/58 |
| 3,800,173 A * | 3/1974 | Rosenberry, Jr. | ................ | 310/59 |
| 3,969,643 A * | 7/1976 | Sapper | ................ | 310/53 |
| 5,331,238 A * | 7/1994 | Johnsen | ................ | 310/58 |
| 5,406,152 A * | 4/1995 | Fechner et al. | ................ | 310/15 |
| 5,747,900 A | 5/1998 | Nakamura et al. | | |
| 6,191,511 B1 * | 2/2001 | Zysset | ................ | 310/60 A |
| 6,288,461 B1 * | 9/2001 | Mori et al. | ................ | 310/58 |
| 6,304,013 B1 * | 10/2001 | Akers et al. | ................ | 310/68 R |
| 6,891,290 B2 * | 5/2005 | Nagayama et al. | ................ | 310/58 |
| 6,943,467 B2 * | 9/2005 | Potoradi et al. | ................ | 310/52 |
| 6,943,470 B2 * | 9/2005 | Rowe et al. | ................ | 310/58 |
| 7,122,923 B2 * | 10/2006 | Lafontaine et al. | ................ | 310/58 |
| 7,411,323 B2 * | 8/2008 | Pfannschmidt et al. | ................ | 310/58 |
| 2003/0102730 A1 * | 6/2003 | Balas | ................ | 310/58 |
| 2006/0273669 A1 * | 12/2006 | Pfannschmidt | ................ | 310/58 |

FOREIGN PATENT DOCUMENTS

| | | |
|---|---|---|
| DE | 21 45 748 | 4/1972 |
| DE | 22 54 995 | 5/1974 |
| DE | 23 60 830 | 6/1975 |

(Continued)

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

The aim of the invention is to optimise cooling electric machines. As a result, a coolant channel (7) is disposed around the cylindrically-shaped magnet arrangement of the electric machine. Said coolant channel can evenly distribute a coolant in the peripheral direction of the cylindrically-shaped magnet arrangement. The flow of coolant is then guided in an axial direction over the magnet arrangement (2), thereby enabling the electric machine to be evenly cooled on the entire periphery thereof.

16 Claims, 2 Drawing Sheets

| | FOREIGN PATENT DOCUMENTS | | | JP | 60 156241 A | 8/1985 |
|---|---|---|---|---|---|---|
| | | | | JP | 08 149757 A | 6/1996 |
| DE | 24 23 853 | 11/1975 | | JP | 09 233766 A | 9/1997 |
| DE | 26 48 824 | 4/1978 | | JP | 09233766 A * | 9/1997 |
| DE | 36 01 089 | 5/1987 | | | | |

* cited by examiner

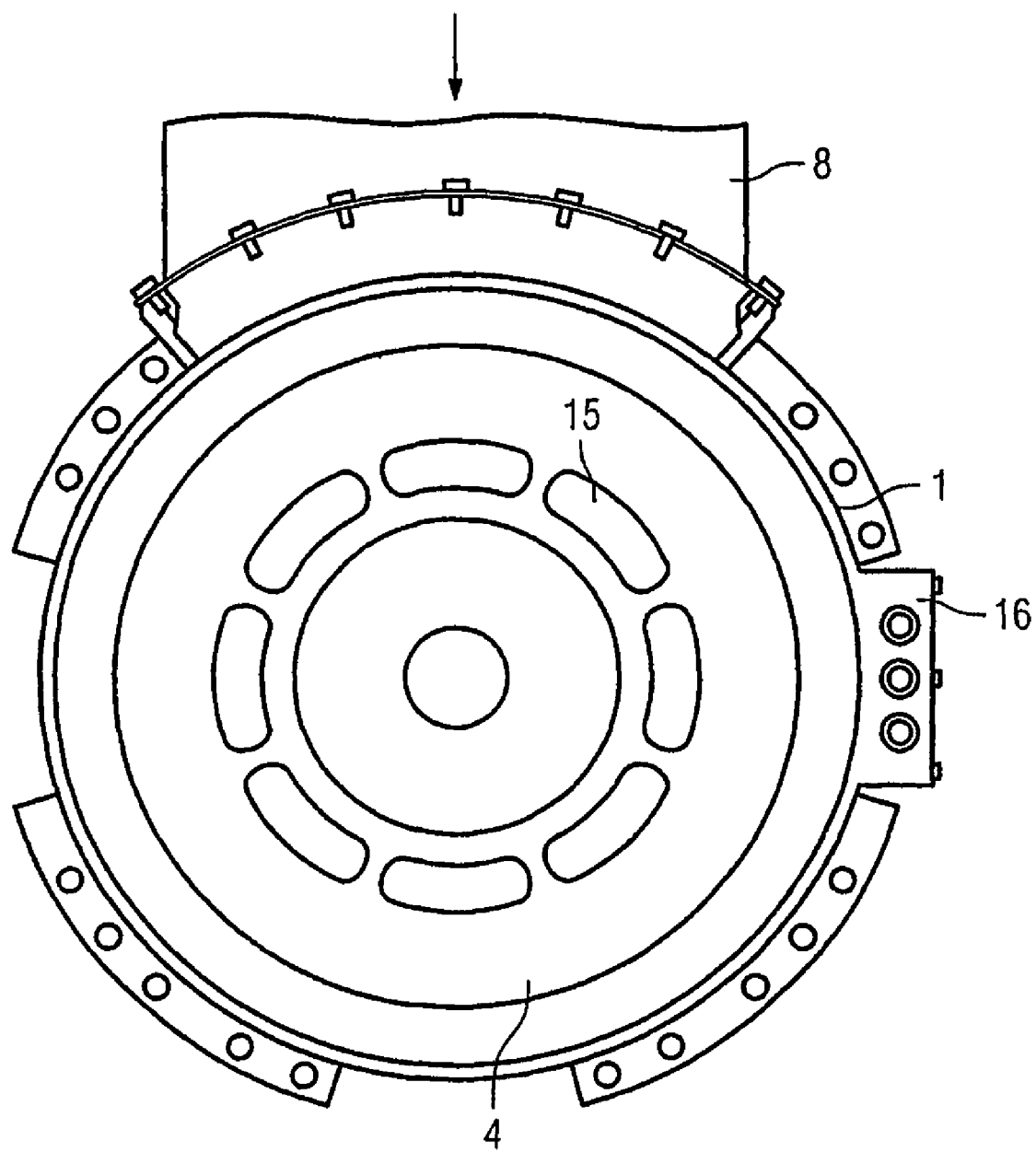

ELECTRIC MACHINE WITH COOLANT GUIDING CHANNEL AND CORRESPONDING COOLING METHOD

BACKGROUND OF THE INVENTION

The present invention relates to an electric machine with a cylindrical magnet arrangement and with a cooling device for cooling the magnet arrangement. The present invention relates, furthermore, to a corresponding method for cooling an electric machine.

Electric machines of a large type of construction, above all, are to be equipped, as a rule, with a cooling system. The customary way of supplying coolant is to introduce it directly into the interior of the electric machine. The coolant mostly enters one of the two bearing shields. The coolant normally used is air. The air conducted into the interior is distributed according to the space conditions. The flow through cooling channels, which are provided, for example, in the laminated core of the electric machine, takes place according to the flow resistances which arise. In many motors, it is necessary to position the entry of air into the region of the bearing shields, with the result that appropriate measures must be taken to achieve a sufficient cooling effect.

SUMMARY OF THE INVENTION

The object of the present invention is, therefore, to propose an electric machine having an improved cooling system. Furthermore, a corresponding cooling method is to be specified.

According to the invention, this object is achieved by means of an electric machine with a cylindrical magnet arrangement and with a cooling device for cooling the magnet arrangement, the cooling device having a coolant channel, by means of which a coolant can be distributed essentially uniformly in the circumferential direction of the cylindrical magnet arrangement.

Furthermore, according to the invention, a method is provided for cooling an electric machine which possesses a cylindrical magnet arrangement by the conduction of a coolant stream around the cylindrical magnet arrangement, the coolant stream, after being introduced into the electric machine at the commencement of the cooling operation, being distributed essentially uniformly on the circumference of the magnet arrangement.

The invention is based on the idea that the coolant should sweep over as large a heated surface as possible and thus achieve as high a cooling action as possible. This is achieved in that the coolant is guided into the interior of the machine in such a way as to be distributed as uniformly as possible on the circumference of the magnet arrangement of the electric machine. It is thus possible to prevent some regions on the circumference of the magnet arrangement from not having a flow of coolant around them. It may be advantageous, in this case, that the coolant is introduced simultaneously on both sides of the electric machine, that is to say the drive side and the non-drive side.

The electric machine may be configured, according to the invention, such that it has a housing, the coolant channel being part of the housing. This form in one piece leads to manufacturing benefits.

The coolant channel may surround the magnet arrangement of the electric machine completely on the circumference. An ideal distribution on the circumference can thereby be ensured. In an alternative embodiment, however, the coolant channel may also be interrupted, for example, opposite the point of coolant entry. This may be necessary, for example, in order to maintain ground clearance in the case of a travel drive, for example for railroads.

A laminated core of the magnet arrangement, in particular the stator laminated core, preferably forms a wall of the coolant channel. In particular, throughflow channels may be provided, which are closed off inwardly by the laminated core surface. The coolant stream is then conducted from the peripheral coolant channel through the throughflow channels into the interior of the machine, for example on the drive side. The coolant thereby first, before entering the interior of the motor, brushes over the laminated core surface and cools the latter. A better machine cooling is thereby achieved, and there can be a higher power output.

Furthermore, the coolant channel may be arranged upstream of the cylindrical magnet arrangement in the axial direction. In general, the coolant channel may be arranged in any desired radius about the axis of the electric machine. It therefore does not necessarily have to be formed radially above the magnet arrangement of the electric machine.

Furthermore, the coolant channel may be open in one or both axial directions and be capable of being covered with a bearing shield and/or an annular cover. This means, for the coolant stream, that the coolant is first distributed uniformly on the circumference of the machine by the coolant channel, in order then to flow axially from there into the interior of the machine on one side or on both sides. This design considerably improves cooling of the machine. The design variant in which the peripheral coolant channel is open to both interiors (drive side and non-drive side) is suitable for a universal motor housing. If the inflow of the coolant into one of the interiors is not desired, this orifice may be covered by a cover or a bearing shield. This avoids the need for the outlay involved in having to provide two different motor housings for both applications. Furthermore, the second orifice has advantages with regard to the casting of the housing and may be configured such that it allows the simple cleaning of the peripheral channel and of channel extensions adjoining the latter.

One or more coolant entries may be arranged on the coolant channel radially and/or axially with respect to the cylindrical magnet arrangement. Advantageously, both a radial and an axial coolant entry are provided, in each case only one of these being used according to the application.

Moreover, the electric machine may have a motor terminal junction box, the peripheral coolant channel being reduced in its dimension in the radial direction in the region of the motor terminal junction box. By the coolant channel being narrowed, construction space can be saved in the radial direction.

The housing of the electrical machine may be produced as a separate part, to be precise as a casting or welded structure. The laminated core with winding is then fastened in this housing, for example by means of feather keys or screws. Alternatively, the housing may be produced as a pressure plate structure, the laminated core being pressed between two pressure plates and being held together by means of welded tension battens.

BRIEF DESCRIPTION OF THE DRAWING

The present invention, then, is explained in more detail with reference to the accompanying drawings in which:

FIG. 2 shows a top view of the non-drive side of the electric machine of FIG. 1.

DETAILED DESCRIPTION OF PREFERRED EMBODIMENTS

Figure 1:
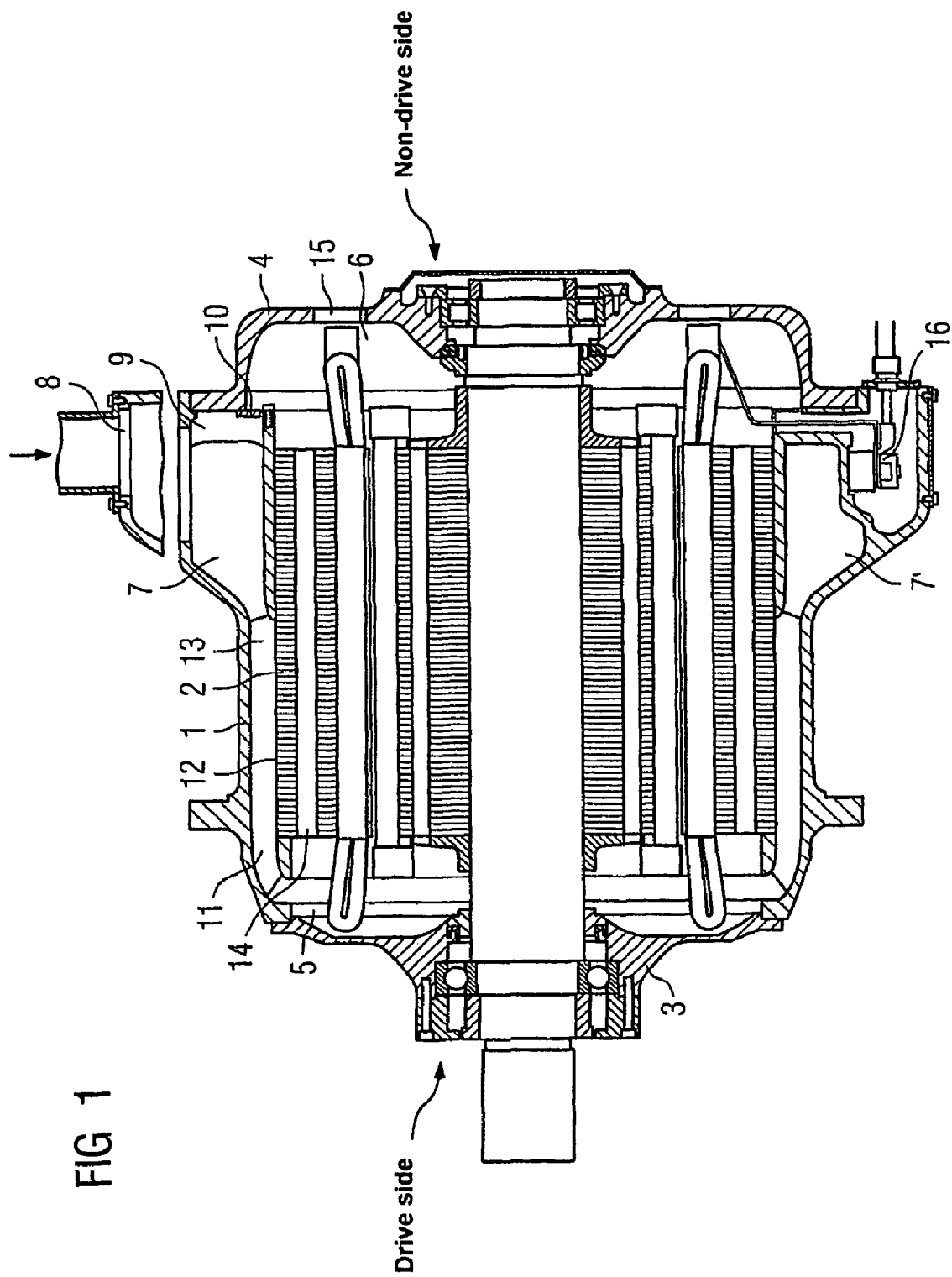
FIG. 1 shows a cross-sectional view of an electric machine according to the invention.

The exemplary embodiment described in more detail below constitutes a preferred embodiment of the present invention.

The cross-sectional drawing of FIG. 1 illustrates an electric motor with housing 1. The housing 1 surrounds the laminated core 2 of the stator.

The motor is closed off by means of bearing shields 3 and 4 on the drive side and the non-drive side. This results in a motor interior 5 on the drive side and in a motor interior 6 on the non-drive side.

The housing 1 has integrated into it a peripheral coolant channel 7. The latter is cast in one piece with the housing 1. It runs peripherally around the laminated core 2 completely on the outer circumference of the latter. The coolant entry 8 is mounted on the coolant channel 7 on the outer circumference of the latter. The coolant can consequently be introduced essentially radially into the peripheral coolant channel 7, as indicated by the arrow.

The peripheral coolant channel is open toward the non-drive side. In the region of this annular orifice, the coolant channel 7 is stiffened by means of ribs 9. This orifice of the coolant channel 7 is partially covered on the non-drive side by means of the bearing shield 4. The orifice is closed completely by an annular cover 10.

The peripheral coolant channel 7 possesses a plurality of orifices toward the drive side in the axial direction, so that the coolant can flow in axial channels 11 in the axial direction to the drive-side motor interior via the laminated core 2. In this case, the coolant flows directly on the surface 12 of the laminated core 2, so that as much heat as possible can be discharged to the coolant. The axial channels are separated from one another by ribs 13 which serve for supporting the housing 1 on the laminated core 2.

In the laminated core 2, bores 14 are provided, through which the coolant can flow through the stator (the same applies similarly to the rotor). Finally, the bearing shield 4 is provided on the non-drive side with clearances 15, through which the coolant can emerge from the motor. This results in a run of the coolant stream from the coolant entry 8 into the peripheral coolant channel 7, the adjoining axial channels 11, the motor interior 5, the bores 14 in the laminated core, the motor interior 6 on the non-drive side and finally through the clearances 15 in the bearing shield 4 located on the non-drive side, to the outside. It should be stated, in this regard, that the coolant, where it enters the coolant channel 7, is first distributed in the circumferential direction, since the coolant channel 7 possesses a larger cross section and therefore a lower flow resistance than the axial channels 11.

If the annular cover 10 is not used, the coolant can also flow directly from the peripheral coolant channel 7 into the motor interior located on the non-drive side, so that, for example, coolant heated to a lesser extent can also flow around the winding overhangs in the motor interior 6 located on the non-drive side. This modification of the flow run in the motor can thus be carried out by means of a measure involving little outlay, to be precise merely by attaching or removing the annular cover 10. However, no change to the housing is necessary, so that the housing can be used universally.

The electric connections of the motor take place via a motor terminal junction box 16 which is arranged on the outer circumference of the peripheral coolant channel 7. In the exemplary embodiment of FIG. 1, it is provided diagonally opposite the coolant entry 8. In order somewhat to reduce the radial dimensions of the motor, the peripheral coolant channel 7 is narrowed somewhat in the region of the motor terminal junction box 16, so that a coolant channel 7' of reduced cross section is obtained in this region.

FIG. 2 illustrates the motor of FIG. 1 in a top view on the non-drive side. The radial coolant entry 8 and the clearances 15 through which the coolant, in particular air, flows outward can be seen clearly here. In the configuration of FIG. 2, the motor terminal junction box 16 is not mounted opposite the coolant entry 8 on the housing 1, but, instead, perpendicularly with respect to the coolant entry direction.

What is claimed is:

1. An electric machine, comprising:
a housing defining an axis;
a coolant entry arranged on one side of the housing for entry of coolant;
a cylindrical magnet arrangement received in the housing and defining a circumference, said magnet arrangement having axial bores; and
a cooling device for cooling the magnet arrangement, wherein the cooling device has a ring-shaped coolant channel extending about an outer circumference of the magnet arrangement and being fluidly connected with the coolant entry such that incoming coolant from the coolant entry flows radially directly onto the magnet arrangement, and separate outer circumferential rectilinear axial channels in fluid communication with the coolant channel so that the coolant is guided in axial direction through the axial channels to an opposite side of the housing and from there is guided inwardly and back in opposite axial direction via the axial bores to the one side for expulsion through an outlet, wherein the ring-shaped coolant channel and the axial channels are configured such that incoming coolant is first distributed by the ring-shaped coolant channel in a circumferential direction before entering the axial channels and flowing essentially uniformly about the circumference of the cylindrical magnet arrangement.

2. The electric machine as claimed in claim 1, wherein the coolant channel is part of the housing.

3. The electric machine as claimed in claim 1, wherein the magnet arrangement has a laminated core forming a wall of the coolant channel.

4. The electric machine as claimed in claim 1, wherein the coolant channel is arranged upstream of the cylindrical magnet arrangement, as viewed in an axial direction.

5. The electric machine as claimed in claim 1, wherein the coolant channel is open in one or both axial directions, and further comprising a bearing shield and/or an annular cover for covering the coolant channel.

6. The electric machine as claimed in claim 1, further comprising a motor terminal junction box, wherein the coolant channel has a reduced dimension in a radial direction in a region of the motor terminal junction box.

7. The electric machine as claimed in claim 1, wherein the housing is constructed in the form of a pressure plate structure.

8. A method for cooling an electric machine having a cylindrical magnet arrangement, comprising the steps of:
introducing a coolant stream through a coolant entry, and
distributing the coolant stream, after being introduced into the electric machine at commencement of a cooling operation, essentially uniformly about a circumference of the magnet arrangement via a ring-shaped coolant channel extending about an outer circumference of the magnet arrangement and being fluidly connected with the coolant entry such that incoming coolant from the coolant entry flows radially directly onto the magnet arrangement, and via separate outer circumferential rectilinear axial channels which are in fluid communication with the coolant channel so that the coolant is guided in axial direction through the axial channels to an opposite side of the housing and from there is guided inwardly and back in opposite axial direction via the axial bores to the one side for expulsion through an outlet, wherein incoming coolant is first distributed by the ring-shaped coolant channel in a circumferential direction before entering the axial channels and flowing essentially uniformly about the circumference of the cylindrical magnet arrangement.

9. The method as claimed in claim 8, wherein the coolant stream is distributed on the magnet arrangement completely about the circumference before conducted in a radial or axial direction.

10. The method as claimed in claim 8, wherein the coolant stream, when being conducted around the magnet arrangement in a circumferential direction, is conducted directly past a laminated core of the magnet arrangement.

11. The method as claimed in claim 8, wherein the coolant stream is distributed in a circumferential direction upstream of the cylindrical magnet arrangement in an axial direction, before being conducted about the magnet arrangement.

12. The method as claimed in claim 8, wherein the coolant stream, after being distributed in the circumferential direction, is conducted in both axial directions.

13. The electric machine as claimed in claim 1, wherein the housing has opposite drive and non-drive sides, said coolant entry being arranged on the non-drive side.

14. The electric machine as claimed in claim 1, wherein the coolant entry is arranged on the coolant channel axially with respect to the cylindrical magnet arrangement.

15. The electric machine as claimed in claim 1, wherein the coolant channel has a cross section which is greater than a summed cross section of the axial channels.

16. The electric machine as claimed in claim 1, wherein each of the axial channels is defined by a cross section which is smaller than a cross section of the ring-shaped coolant channel so that a flow resistance applied by the ring-shaped coolant channel is smaller than a flow resistance applied by the axial channels to thereby force the coolant to flow first in the ring-shaped coolant channel in the circumferential direction.

* * * * *